United States Patent
Oh et al.

(10) Patent No.: US 7,746,837 B2
(45) Date of Patent: Jun. 29, 2010

(54) OVERHEAR-BASED TRANSMITTING CONTROL SYSTEM IN WLANS

(75) Inventors: Ha-young Oh, Dongjak-gu (KR); Sung-ro Yoon, Gangnam-gu (KR); Ki-baek Yoo, Gwanak-gu (KR); Chong-kwon Kim, Seocho-gu (KR)

(73) Assignee: Seoul National University Industry Foundation, Seoul (KR)

( * ) Notice: Subject to any disclaimer, the term of this patent is extended or adjusted under 35 U.S.C. 154(b) by 607 days.

(21) Appl. No.: 11/675,954

(22) Filed: Feb. 16, 2007

(65) Prior Publication Data

US 2008/0181101 A1    Jul. 31, 2008

(30) Foreign Application Priority Data

Jan. 31, 2007   (KR) .................. 10-2007-0009816

(51) Int. Cl.
  *H04W 4/00*  (2009.01)
(52) U.S. Cl. .................. 370/338; 455/428; 455/445
(58) Field of Classification Search .............. 370/328, 370/310.2, 229, 235, 395.53, 315; 455/428, 455/445, 11.1, 13.1, 15, 16, 41.2; 709/223–225, 709/227, 229, 238
See application file for complete search history.

(56) References Cited

U.S. PATENT DOCUMENTS

| | | | |
|---|---|---|---|
| 6,404,756 B1 * | 6/2002 | Whitehill et al. | 370/338 |
| 2002/0132609 A1 * | 9/2002 | Lewis et al. | 455/412 |
| 2003/0133427 A1 * | 7/2003 | Cimini et al. | 370/338 |
| 2005/0073992 A1 * | 4/2005 | Lee et al. | 370/351 |
| 2006/0114867 A1 * | 6/2006 | Du et al. | 370/338 |

* cited by examiner

*Primary Examiner*—Kent Chang
*Assistant Examiner*—San Htun
(74) *Attorney, Agent, or Firm*—Oblon, Spivak, McClelland, Maier & Neustadt, L.L.P.

(57) ABSTRACT

We propose overhear-based transmitting control system in WLANs to improve performance of 802.11 wireless LANs. The main idea of this scheme is that when the transmission of a node fails, one of neighboring nodes with better channel quality retransmits the lost frame in substitution. To do so, every node should maintain overhear table to buffer the transmitted packets that is not yet acknowledged. We also present algorithms to retransmit lost packets, to maintain the overhear table and to compensate for the retransmission of packets of other nodes. The performance of this scheme is evaluated via simulations in terms of MPDU size and average path loss. It shows that in environments where the packet is likely to be lost more, the throughput gain of our proposed scheme performs better.

15 Claims, 9 Drawing Sheets

OVERHEAR-BASED TRANSMITTING CONTROL SYSTEM IN WLANS

BACKGROUND OF THE INVENTION

1. Field of the Invention

The present invention relates to an Overhear-based transmitting control system for improving performance of 802.11 WLANs. The main idea of this scheme is that when the transmission of a node fails, one of neighbor nodes with better channel condition transmits the lost frame as well as the own data using MPDU aggregation scheme. To do so, every node should manage overhear table to buffer the transmitted packets that is not yet acknowledged. We also present algorithms to retransmit lost packets, to maintain the overhear table and to compensate for the retransmission of packets of other nodes.

2. Description of the Related Art

IEEE 802.11 standard supports two different MAC protocols. One is DCF and the other is PCF. In DCF, when stations face the failure of transmission, they retransmit the collided packets according to binary exponential backoff rules. Backoff rule is that each station delays to transmit the packets for a time period which is chosen uniformly from the range of 0 to its contention window size (CW). After each successful data transmission, the window size is set to CWmin, which denotes the prespecified minimum contention window. This makes the delay of transmission by each station and the throughput performance of the 802.11 WLAN poor according to the number of retransmission increases. Because retransmission of failed data allows other stations to lose their channel access chances and increases the number of MAC/PHY overheads.

To exploit the improvement using physical layer multirate capability, researchers have proposed various protocols. At the network layer, some channel state aware routing schemes have been studied to improve the end-to-end throughput by taking into account the channel condition as one of the route selection metrics. However, due to the long latency of route updates and the high control overhead, these schemes cannot quickly react to dynamic channel condition and can not achieve high bandwidth utilization. At the MAC layer, many schemes have been proposed to exploit the multirate capability. The basic idea of these schemes is to let the sender select a proper transmission rate according to the history of the successful transmissions or to let the receiver sense the channel condition before the transmission and notify the sender via a control packet (e.g., the clear-to-send (CTS) packet). However, these schemes only utilize the data rate of the direct link between the sender and the receiver. In many cases, data may be delivered much faster through multiple links that have high channel quality than through the direct link with the same transmission rate.

Hao Zho and Shihong Zou designed a novel relay-enabled DCF protocol, called rDCF, to exploit the physical layer multirate capability. According to the channel condition, data can be transmitted with different rates and some data packets may be delivered faster through a relay node than through the direct link if the direct link has low quality and low rate. The basic protocol of rDCF is proposed to help the sender, the relay node, and the receiver coordinate to decide what data rate to use and whether to use a relay node. However, rDCF are insufficient to decrease the number of MAC/PHY overheads because it did not consider the aggregated data scheme. And it does not consider the throughput gain of the relay-enabled DCF protocol when every station has the same physical layer rate. Finally, rDCF is possible in assuming whenever every station can do the triangle handshake with any stations.

SUMMARY OF THE INVENTION

DCF provides an equal opportunity of channel access chance to every station using a random access scheme, based on CSMA/CA protocol. When stations experience the failure of transmission, they retransmit the collided packets according to binary exponential backoff rules. This makes the throughput performance of the 802.11 WLAN extremely poor. Because retransmission of failed data allows other stations to lose their channel access chances and increases the number of MAC/PHY overheads such as MAC header, Physical Layer Convergence Protocol (PLCP) preamble/header, acknowledgement (ACK) transmission, and some Inter Frame Spaces (IFSs). These overheads are added to each frame transmission in a fixed manner. Therefore, a number of the small-size frame retransmission can cause the throughput performance depreciation.

There are several characteristics of radio communication. One of them is overhearing. All stations naturally overhear the packets of neighbor stations. And another characteristic of radio communication has the coherence time. It means that channel status is good or bad for certain period of time. As stated in, when the node does not move very fast, i.e., less than 20 m/s, the coherence intervals are guaranteed during multiple packet transmission times.

Therefore, the present invention has been made in view of the above problems, and it is an object of the invention to fully utilize the channel access opportunity of packet transmission when channel status is good considering reducing MAC/PHY fixed overheads. It could be one way to enhance the throughput performance of the 802.11 WLAN.

In accordance with one aspect of the present invention, these objects are accomplished by providing an Overhear-based transmitting control system in WLANs comprising the steps of: a) compensation part, after each station naturally overhears the transmitted packets of other stations, it buffers the packets that is not yet acknowledged in overhear table. Each station has its own data table and overhear table. Own data table contains actual data that has to be sent, and the overhear table includes the data failed to transfer from other stations. And when a station grabs the channel, it checks the own table to the first and then checks the overhear table whether the data that has to be sent is or not. Then, if overhear table has the data that has to be sent, each station picks the packets which meet given constraints from overhear table (if $\alpha <= \beta$ and $x <= y$).

α: the total MSDU size for sending
β: the maximum MSDU threshold (2304 bytes)
x: the SNR of failed station
y: the SNR of current station After that, it aggregates MSDU chosen from overhear table with its own MSDU selected from the own data table. MSDU (MAC Service Data Unit) is the frame entering or exiting the top of the MAC. It fragments the aggregated packets if the MSDU size is lager than fragment threshold. Finally, it can send the aggregated packets to destination station under better channel quality using the concept of coherence time; b) compensation part, for the fair data transmission, two situations can be considered. First situation is that when a station itself accesses the channel, it checks the debt to neighbor stations before retransmission. That is, a station must check the data already sent by other stations. If the station has the debt to other station, it sends RTS containing the address of proxy (TA field) to AP to compensate the proxy function. Then, AP replies with CTS to proxy. Therefore, the proxy station can be compensated by the channel access chance of original station. FIG. 2 shows the modified RTS/CTS format and the example of compensation case. When station A have the fourth chance to access the channel followed by FIG. 1, station A checks the debt to neighbor station such as station C before retransmission. As a result, because station A has the debt to station C, it sends RTS containing the address of station C (TA field) to AP to compensate the proxy function of station C. Then, AP replies with CTS to station C. Therefore, station C can be compensated by the added channel access chance of station A. Second situation is that when a station accesses the channel by compensation. In this case, even though the station has the debt to other station, it sends its own MSDU to AP.

In accordance with another aspect of the present invention, there is provided Overhear-based transmitting control system in WLANs for managing method of an overhear table. In case of insert part, whenever a station successfully overhears the transmitted packets that is not yet acknowledged, it inserts them into the overhear table. Second, in case of delete part, a station checks the packets specified in the selective ACK frame, a station deletes them from the overhear table. FIG. 3 shows the selective AcK format containing the list of overheard packet addresses and the situation is that station A,B,C delete the overheard packet in each overhear table considering the packets specified in the selective ACK frame.

Preferably, there are two special instances when station does not receive the AcK from destination. One is that proxy station such as station C of FIG. 1, FIG. 2 and FIG. 3 does not receive the AcK from AP. After transmitting packet, proxy station deletes the overheard packet if the channel is busy after SIFS. The other is that station with overhear packet such as station D of FIG. 1 does not receive the AcK from AP. In this case, station D can delete the overheard packet in its overhear table if it successfully overhears the selective AcK from AP. However, when it does not receive the AcK from AP, it can not delete the overheard packet even though the channel is busy after SIFS. The reason is that it cannot distinguish what kind of AcK about overheard packet. Therefore, AP compare the sequence number of overheard packet already delivered with that of overheard currently delivered for the certain time. If it is same, AP drops the retransmitted packets and sends NAcK to stations about overheard packet because of preventing redundant retransmission. FIG. 4 totally shows the flow chart of overhear-based transmitting control system in WLANs.

BRIEF DESCRIPTION OF THE DRAWINGS

The above objects, and other features and advantages of the present invention will become more apparent after reading the following detailed description when taken in conjunction with the drawings, in which.

DESCRIPTION OF THE PREFERRED EMBODIMENTS

Figure 1:
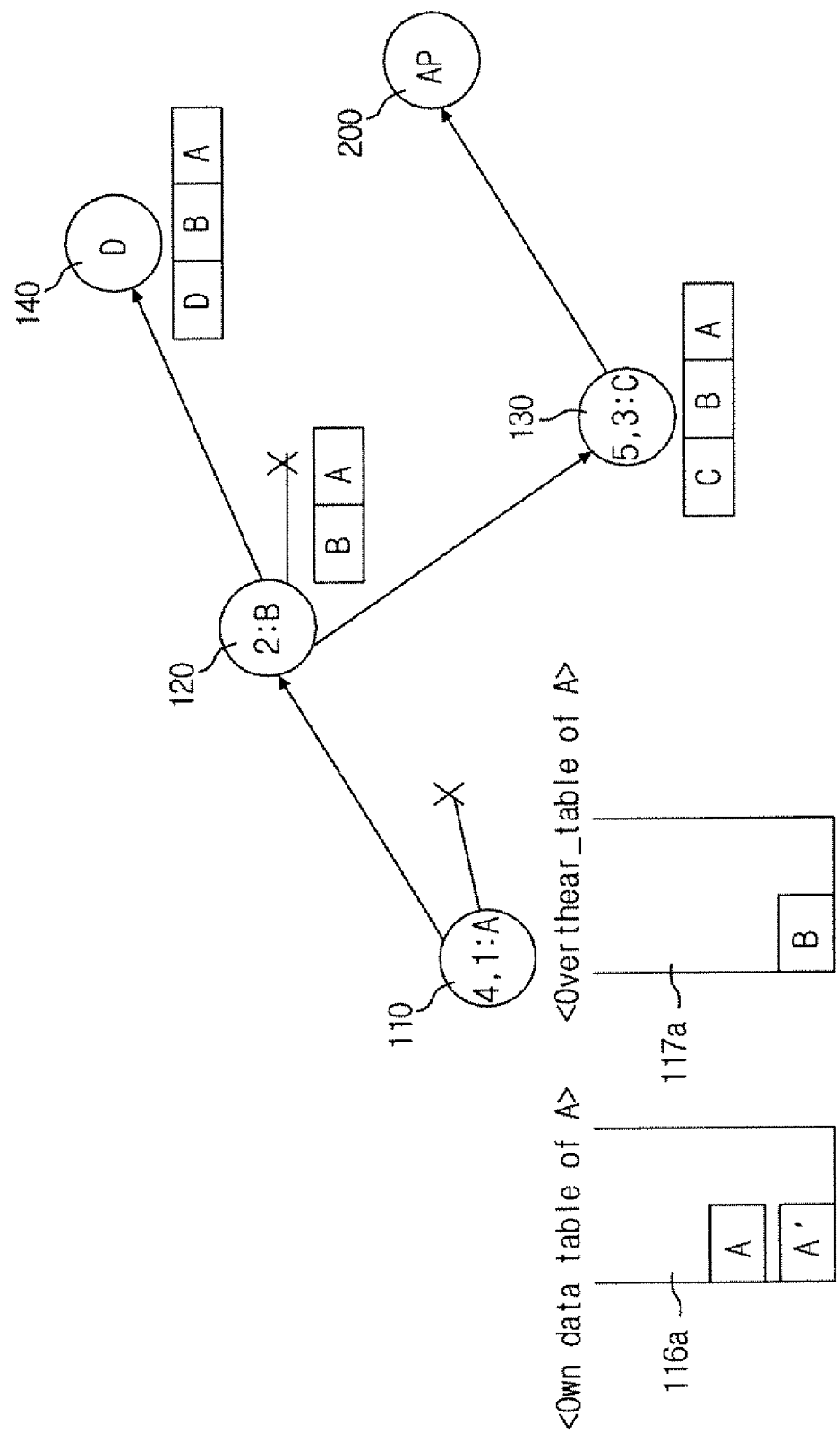
FIG. 1 is a figure illustrating overhear-based transmitting control system in WLANs according to the present invention.

Now, preferred embodiments of the present invention will be described in detail with reference to the annexed drawings. In the drawings, the same or similar elements are denoted by the same reference numerals even though they are depicted in different drawings. In the following description, a detailed description of known functions and configurations incorporated herein will be omitted when it may make the subject matter of the present invention rather unclear.

During the last few years, IEEE 802.11-based wireless networks have become extremely popular among mobile users due to the advantage of low cost, mobility support and high data rate. In order to improve the network performance, it is fundamentally important to design good media access control (MAC) protocols to efficiently utilize the limited spectrum. Two different MAC mechanisms are supported by the IEEE 802.11 standard; One is called distributed coordination function (DCF), which is mandatory contention-based channel access function. The other is called point coordination function (PCF), which employs an optional centrally controlled channel access function and is built on the top of DCF. DCF provides an equal opportunity of channel access chance to every station using a random access scheme, based on the carrier sense multiple accesses with collision avoidance (CSMA/CA) protocol. When stations experience the failure of data transmission cased by collision or bad channel condition, they retransmit the collided packets according to binary exponential backoff rules. This makes the throughput performance of the 802.11 WLAN notoriously poor according to the number of retransmission increases. Because retransmission of the failed data allows other stations to lose their channel access chances and increases the number of MAC/PHY overheads.

Therefore, we propose overhear-based transmitting control system in WLANs to improve performance of 802.11 wireless LANs. Proposed mechanism consists of cooperative part and compensation part. The idea of cooperative part is that when the transmission of a node fails, one of neighboring nodes(proxy) with better channel quality transmits the lost frame as well as the own data using aggregation scheme. To do so, every node should maintain overhear table to buffer the transmitted packets that is not yet acknowledged. In compensation part, as the result of the cooperative part, if the current station has the debt to proxy which already sent the failed the data on behalf of the current station, it sends RTS containing the address of proxy to AP. Therefore, the function of proxy is compensated by the added channel access chances because AP replies with CTS to proxy.

FIG. 1 is a figure illustrating overhear-based transmitting control system in WLANs according to the present invention. FIG. 1 shows a brief idea of our proposed mechanism. The green circles stand for each station. The alphabets on the right in the circle mean the name of the station and the numbers on the left in the circles mean the order of channel access. For instance, the left circle containing 4,1:A in the FIG. 1 shows that station A have the first and forth channel accesses chances. First, station A accesses the channel to transfer its own data but it fails. At that time, station B and C overhear this failed data of station A and save it in each overhear table. Next when station B accesses the channel, it will also check the own data table and overhear table. If it has actual data that has to be sent in own data table, and its SNR is higher than average SNR, it combines MSDU from overhear table with its own MSDU from own data table. Finally, it sends the aggregated packets to AP. However, station B also fails to transmit data to AP. In case of station C, it succeeds to transmit the aggregated packets including MSDU from overhear table with its own MSDU from own data table. Every station deletes the overheard data when they receive selective AcKs from AP.

Figure 2:
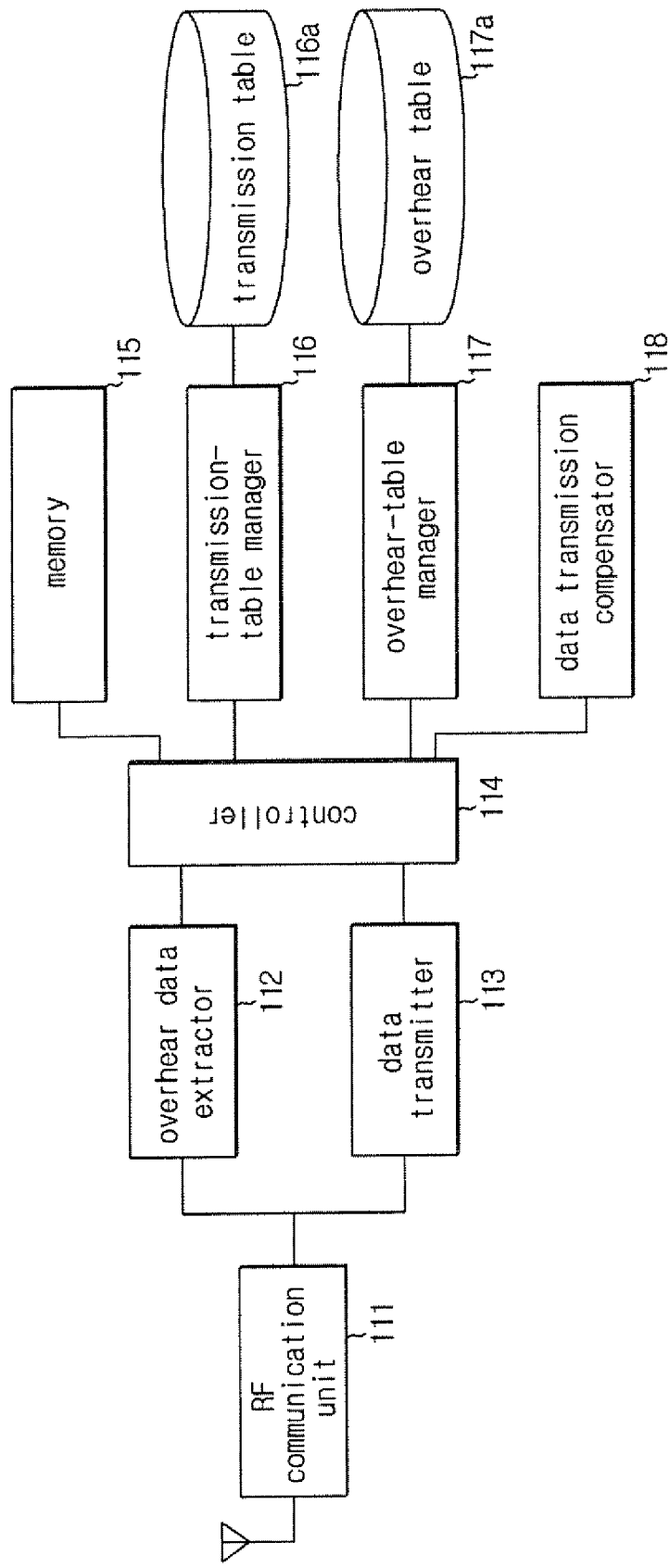
FIG. 2 is a figure illustrating Modified RTS/CTS Format and Compensation example according to the present invention.

FIG. 2 is a figure illustrating Modified RTS/CTS Format and Compensation example according to the present invention.

Figure 3:
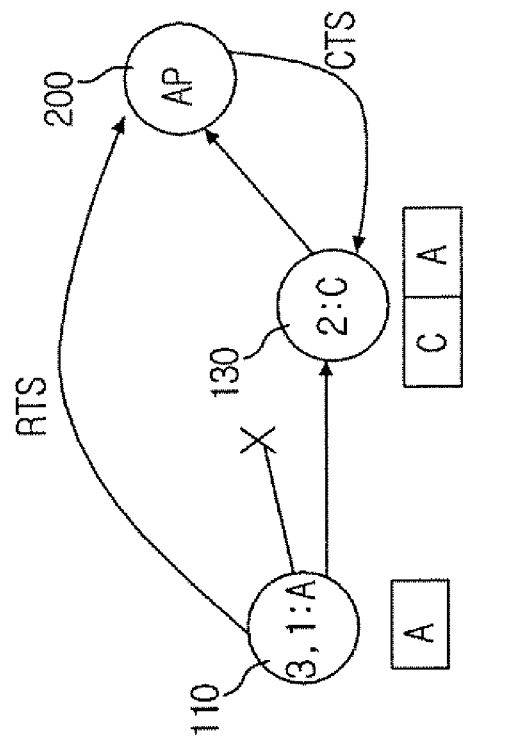
FIG. 3 exemplarily shows figures illustrating Selective AcK Format and deletion Example according to the present invention.
Figure 3:
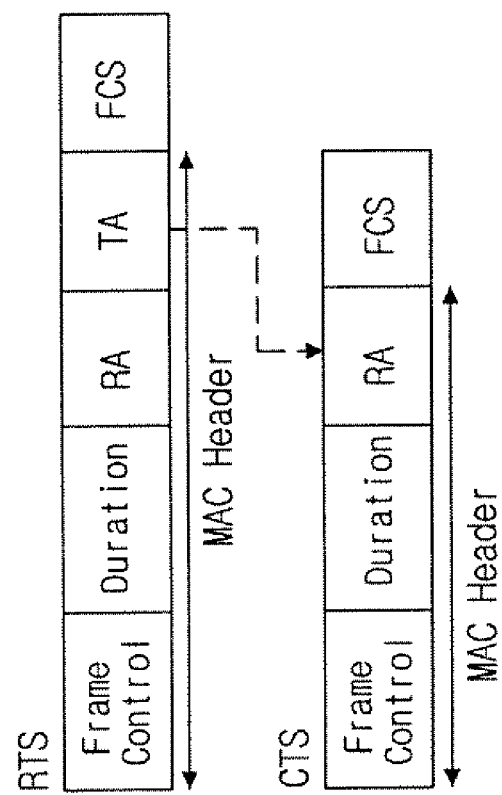

FIG. 3 exemplarily shows figures illustrating Selective AcK Format and deletion Example according to the present invention.

Figure 4:
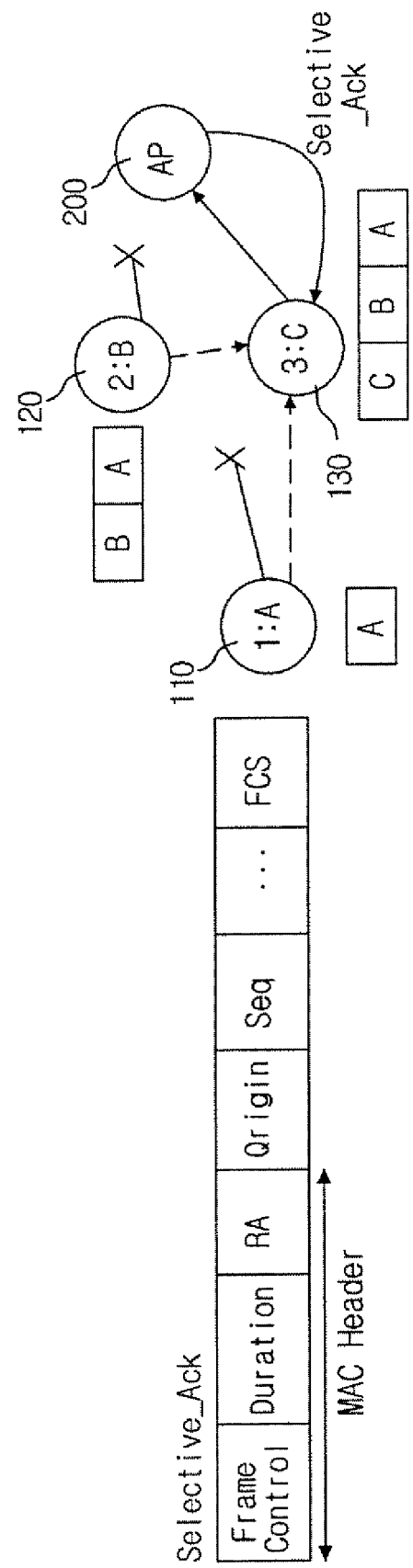
FIG. 4 a conceptual diagram illustrating An overview of overhear-based transmitting control system in WLANs according to the present invention.

FIG. 4 a conceptual diagram illustrating overhear-based transmitting control system in WLANs according to the present invention.

Figure 5:
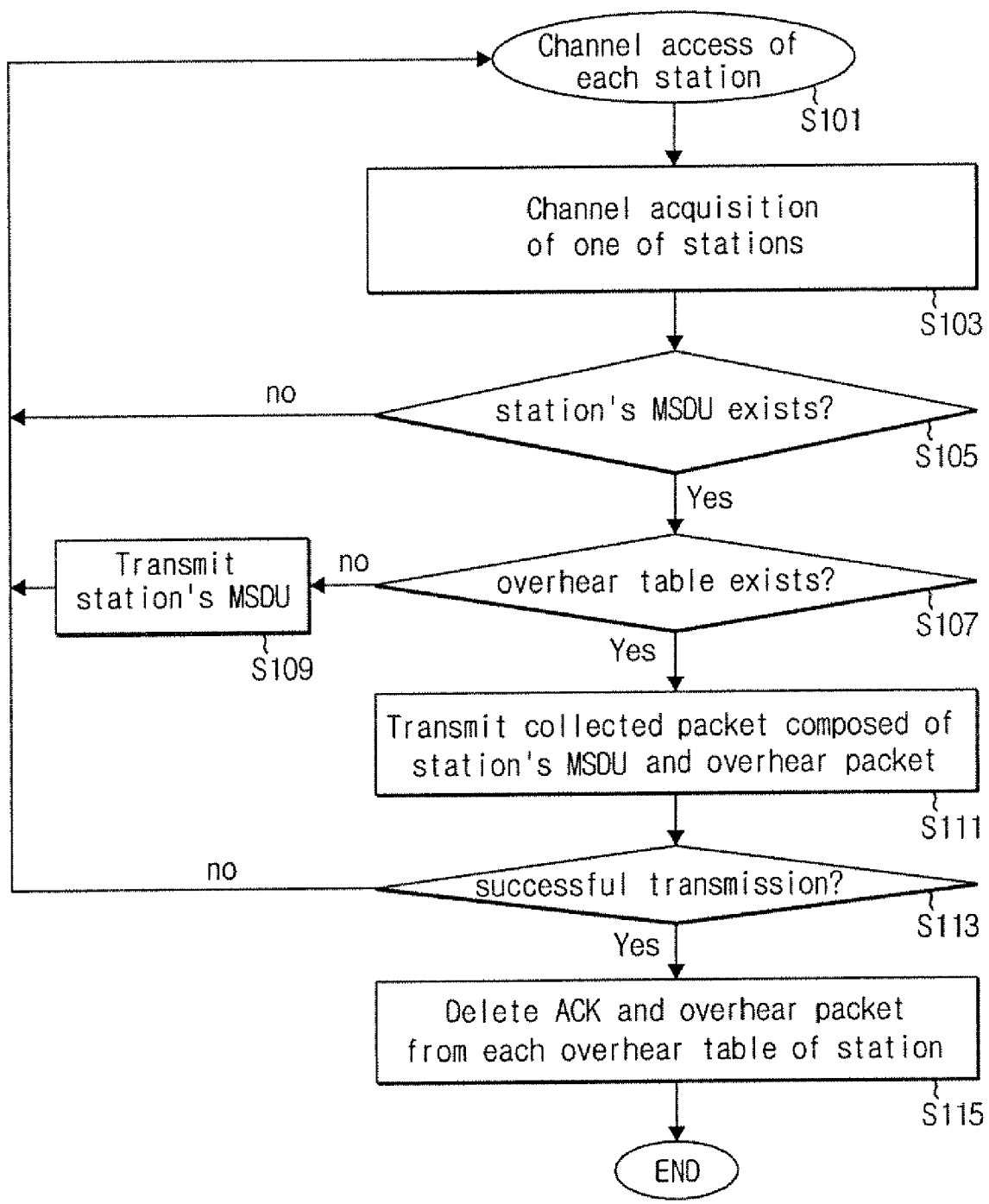
FIG. 5 is a table indicating Simulation parameters according to the present invention.

FIG. 5 is a table indicating Simulation parameters according to the present invention. We evaluate the proposed scheme together with legacy 802.11 DCF protocol using ns-2 simulator.

Table. 1 shows the simulation parameters.

TABLE 1

| Parameter | |
|---|---|
| Areas | 50 m × 50 m |
| Number of nodes | 10 nodes |
| Placements | Randomly |
| AP | Center |
| Movement/Speed | Static/11 Mbps |
| Retransmission limit | 3 |
| Channel model | Rayleigh fading |
| MAC | 802.11 |
| Simulation Time | 180 s |

There are 10 nodes that are randomly located in 50×50 areas. At the center of the network, there is a node which works as AP. All the nodes have uplink and downlink UDP traffic and are communicating via the AP. In the simulation, transmission rate is 11Mbps, FER of the MPDU is derived from the FER function of QAM256 modulation scheme and Rayleigh fading model is used.

Figure 6A:
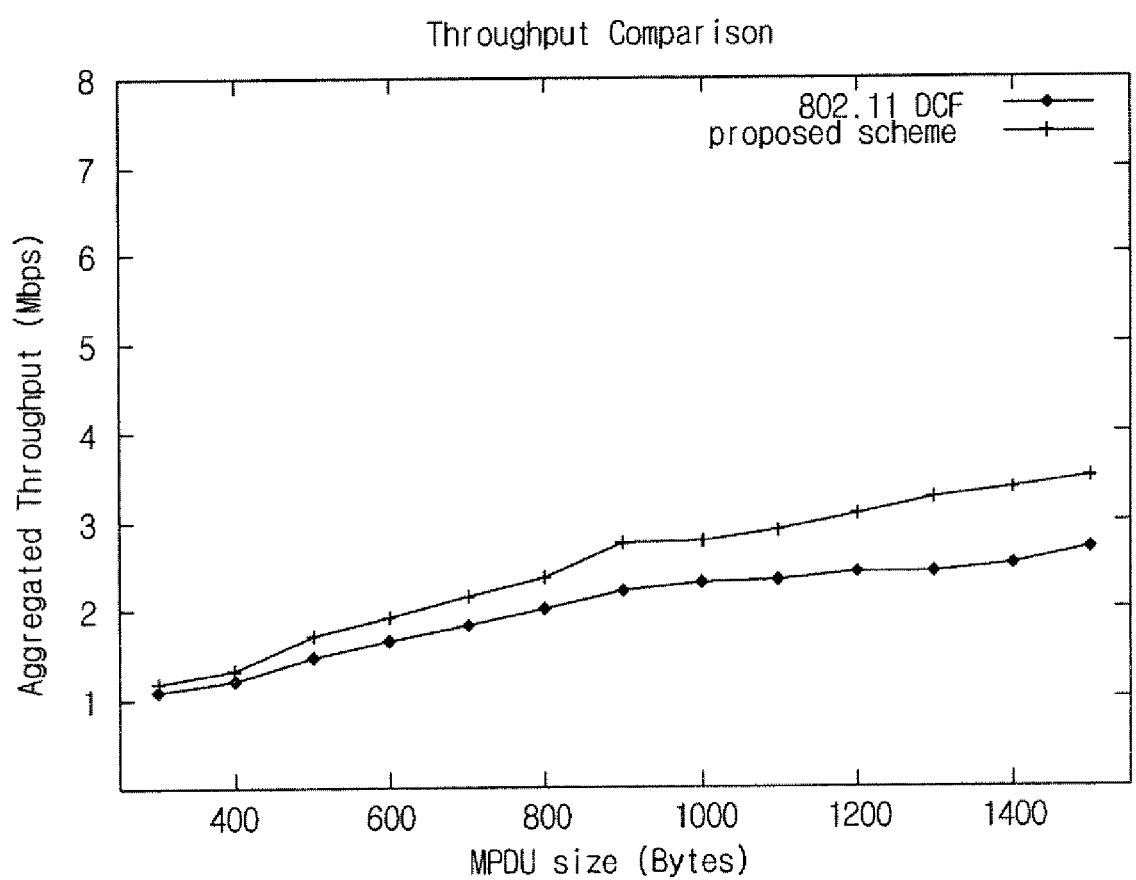
FIG. 6 is a graph illustrating Aggregated Throughput versus MPDU size when the average according to the present invention.
Figure 6B:
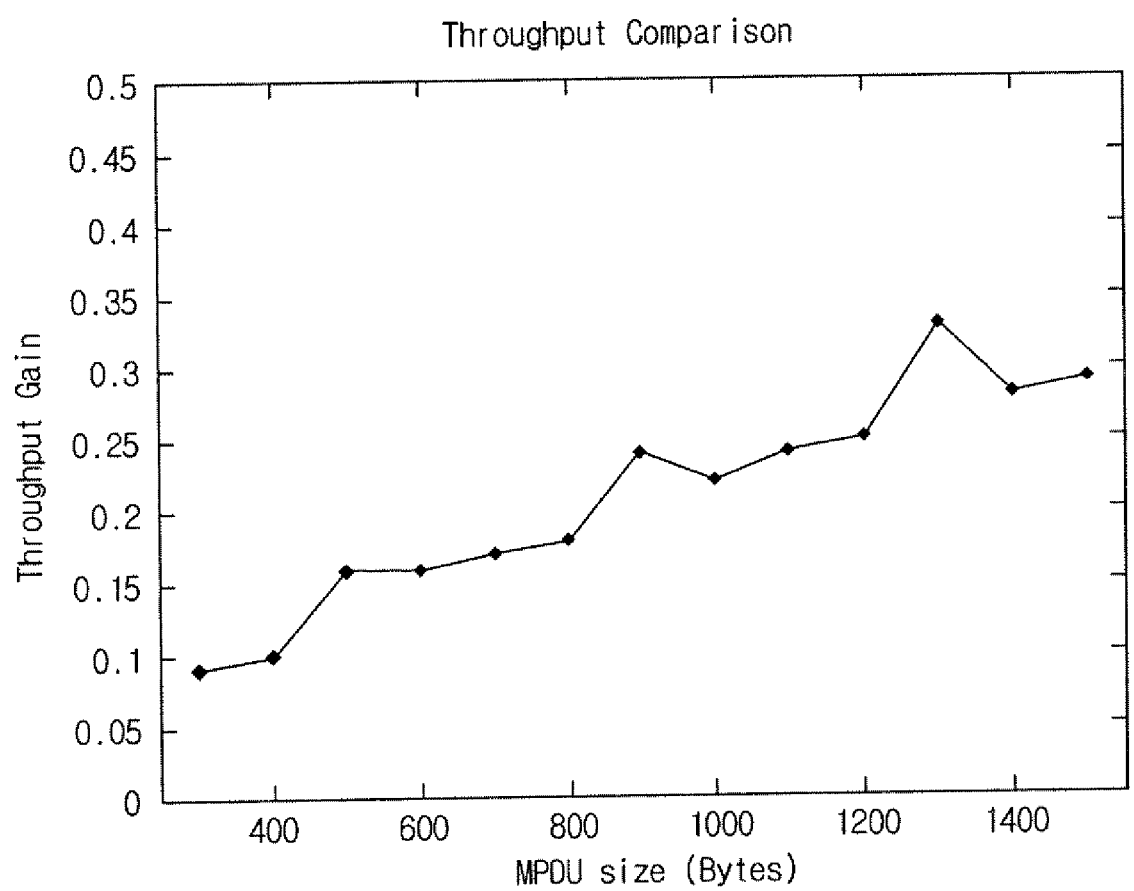

FIG. 6 is a graph illustrating Aggregated Throughput versus MPDU size when the average according to the present invention; In FIG. 6(a), it is shown that the throughput grows larger as the MPDU size increases. It is because the relative overhead to transmit a MPDU is decreased with larger MPDU size. Observing FIG. 6(b), the throughput gain of the proposed scheme over 802.11 DCF also grows as the MPDU size increases. The reason is as follows. When the MPDU size is large, the frame error rate also becomes relatively large and packet transmission of a node will fail more frequently. But when the packet transmission fails, another node with better channel quality will retransmit as a substitute in our scheme. This mechanism makes success probability of retransmission higher compared to 802.11 DCF, in which the success probability of retransmission remains same. And the throughput gain increase as the MPDU size grows large.

Figure 7A:
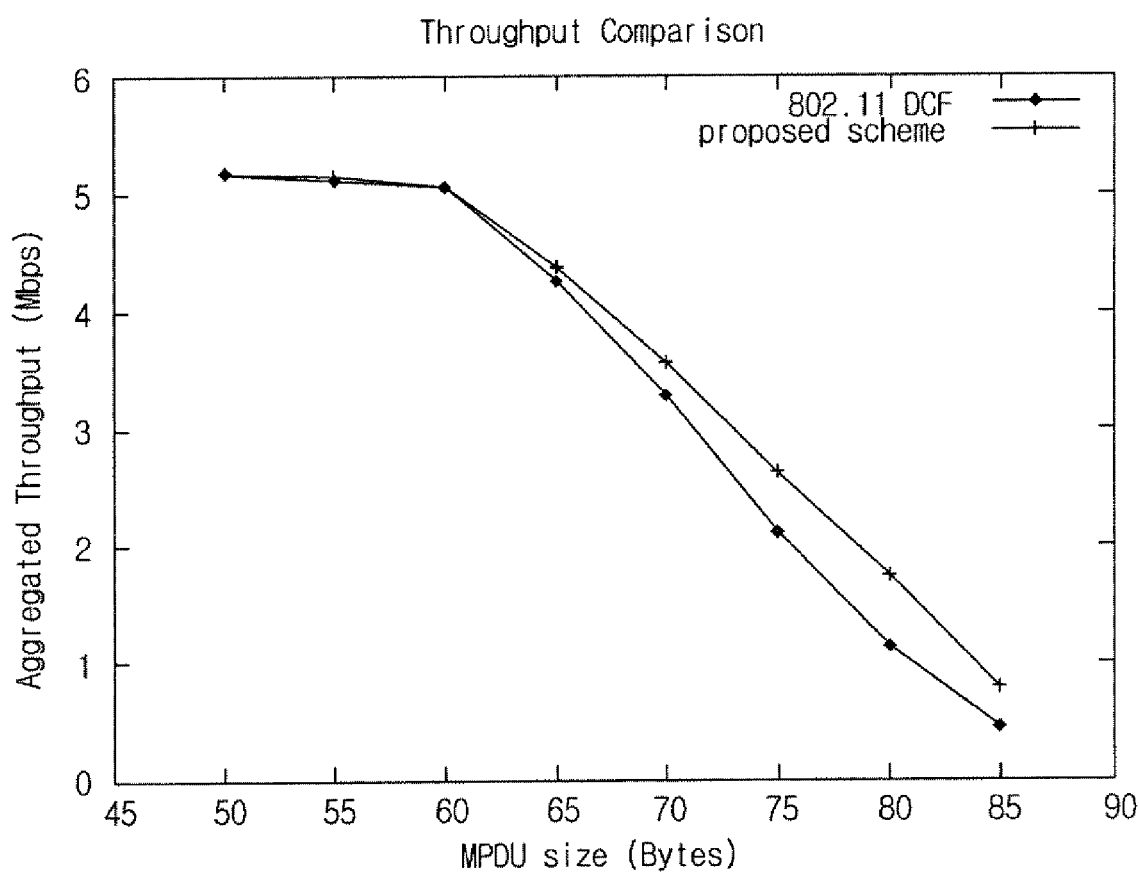
FIG. 7 is a graph illustrating Aggregated Throughput versus average Path Loss when the MPDU size is 1000 bytes according to the present invention.
Figure 7B:
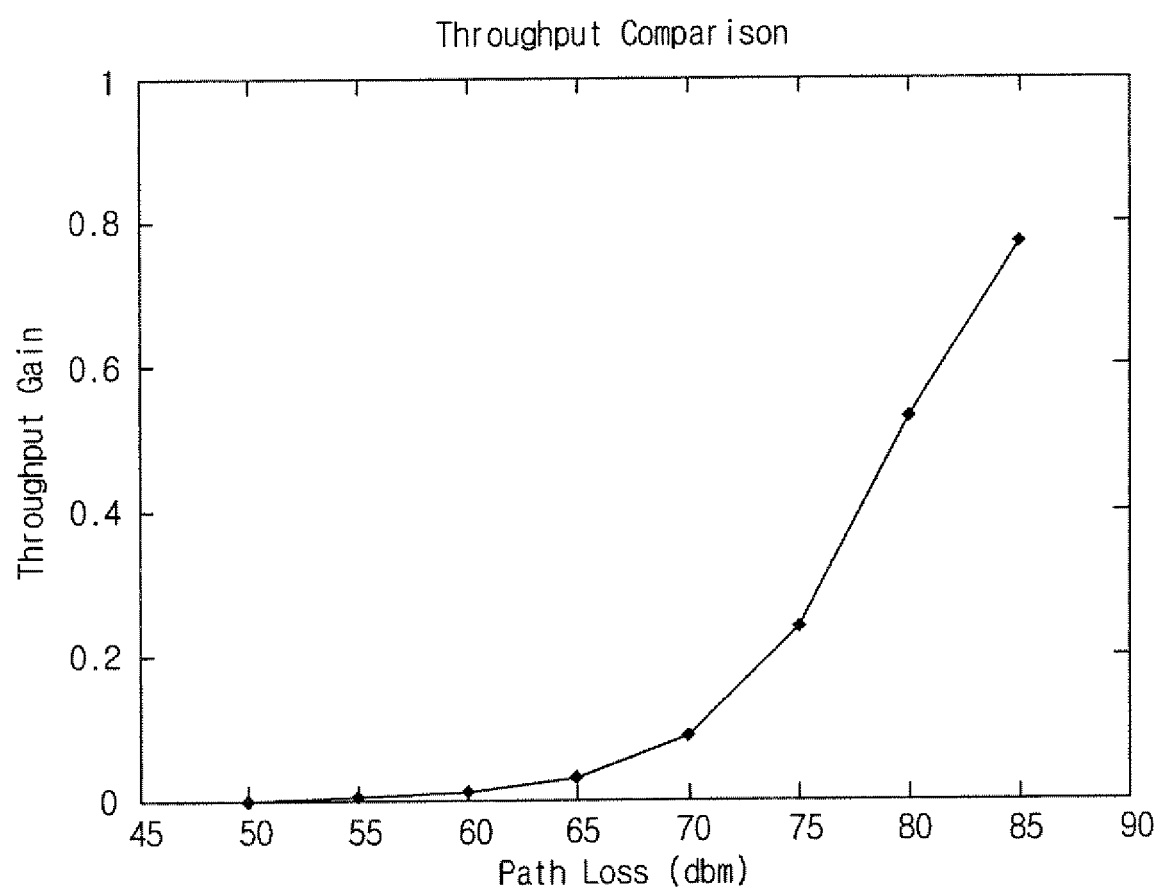

FIG. 7 is a graph illustrating Aggregated Throughput versus average Path Loss when the MPDU size is 1000 bytes according to the present invention; When the average path loss is under 60 dbm, there is almost no packet loss due to channel errors and the throughput gain is very low. As the average path loss grows large, aggregated throughput decreases for both schemes we can observe that there is a lot of throughput gain when the path loss is large. The reason is similar to the case of large MPDU. When the path loss grows large, overall channel quality of the network goes bad. By allowing a neighbor node with better channel quality retransmit the lost frame, our proposed scheme makes the success probability of retransmission higher, while the success probability of retransmission does not change in 802.11 DCF.

What is claimed is:

1. A system for controlling overhear-based packet transmission over a Wireless Local Area Network (WLAN), the system comprising:

at least one station for overhearing data of other stations, collecting/transmitting its own transmission data and data of the other stations if it is determined that a data transmission failure occurs, compensating for channel access opportunities of the other stations if it is determined that the transmission data of the at least one station is transmitted from the other stations; and an access point (AP) for communicating with the at least one station over the WLAN, and equally assigning the channel access opportunity to the at least one station, wherein the station compares its own reception (Rx) signal intensity with a reception (Rx) signal intensity of a transmission-failure station, determines whether a Rx signal strength of the station is higher than the Rx signal intensity of the transmission-failure station, determines whether a MAC Service Data Unit (MSDU) equal to a sum of the transmission data of the station and overhear data of the transmission-failure station is larger than a maximum MSDU, performs fragmentation of the MSDU if the Rx signal strength of the station is higher than the Rx signal intensity of the transmission-failure station and the MSDU is larger than the maximum MSDU, and transmits the fragmented MSDU several times.

2. The overhear-based packet transmission control system according to claim 1, wherein the station manages an overhear table, determines a presence or absence of a data transmission failure of the other stations, and stores a packet of the data transmission failure of the other stations in the overhear table if the presence of the data transmission failure of the other stations is determined.

3. The overhear-based packet transmission control system according to claim 1, wherein the station includes a transmission table for managing its own transmission data.

4. The overhear-based packet transmission control system according to claim 1, wherein the station, if the station has the channel access opportunity and has to compensate the other stations for the channel access opportunity of the station, generates a modified RTS including address information of the compensation-object station, and transmits the modified RTS including the address information to the access point (AP).

5. The overhear-based packet transmission control system according to claim 1, wherein the at least one station, upon receiving an acknowledgement (ACK) message indicating successful transmission completion from the access point (AP) acting as a destination, deletes a list of data to be transmitted to the destination from its own overhear table.

6. The overhear-based packet transmission control system according to claim 1, wherein the access point (AP), upon receiving a modified RTS including address information of a compensation-object station from the station, transmits a CTR to the compensation-object station, and assigns a data transmission opportunity to the compensation-object station.

7. The overhear-based packet transmission control system according to claim 6, wherein the compensation-object station, upon receiving the channel access opportunity acquired by the compensation of the at least one station, does not re-compensate for the acquired channel access opportunity although is a debt exists to the other stations, and uses the acquired channel access opportunity for the compensation-object station.

8. The overhear-based packet transmission control system according to claim 1, wherein the at least one station includes:
- a Radio Frequency (RF) communication unit for communicating with the access point (AP), and/or overhearing the other stations;
- an overhear-data extractor for extracting overhear data of the other stations in conjunction with the RF communication unit;
- a controller for managing the overhear data extracted from the overhear-data extractor, controlling management of the transmission data of the station, considering a reception (Rx) signal intensity of the station and a Rx signal intensity of a transmission-failure station from among the other stations during a data transmission time, collecting the transmission data of the station and the overhear data, and controlling a data transmission using the collected data;
- a data transmitter for transmitting the collected data to the access point (AP) over the RF communication unit upon receiving a control signal from the controller;
- a transmission-table manager for storing the transmission data of the station in a transmission table and managing the data stored in the transmission table;
- an overhear-table manager for storing the overhear data in an overhear table and managing the overhear data stored in the overhear table; and
- a data transmission compensator associated with the controller, wherein if the data transmission compensator has the channel access opportunity and has to compensate the other stations for the channel access opportunity of the station, the data transmission compensator generates a modified RTS including address information of a compensation-object station, and transmits the modified RTS including the address information of the compensation-object station to the controller, thereby compensating for the data transmission.

9. A method for controlling overhear-based packet transmission over a Wireless Local Area Network (WLAN) in an overhear-based packet transmission control system, which includes at least one station for overhearing data of other stations, collecting/transmitting its own transmission data and data of the other stations if it is determined that a data transmission failure occurs, compensating for channel access opportunities of the other stations if it is determined that the transmission data of the at least one station is transmitted from the other stations, and an access point (AP) for communicating with the at least one station over the WLAN, and equally assigning the channel access opportunity to the at least one station, the method comprising:
- if the at least one station can access a channel, allowing one of the other stations to acquire the channel;
- overhearing packets of neighboring stations of the remaining stations other than the channel-acquisition station;
- allowing the channel-acquisition station to determine the presence or absence of its own MAC Service Data Unit (MSDU), and determining the presence or absence of an overhear table if the presence of the MSDU is determined;
- configuring a transmission packet composed of the MSDU and overhear data if the presence of the overhear table is determined, and transmitting the configured transmission packet to the access point (AP); and
- allowing a corresponding station to delete an acknowledgement (ACK) message and an overhear packet from the overhear table, if successful transmission completion of the transmission packet is determined, wherein
- the channel-acquisition station compares its own reception (Rx) signal intensity with a reception (RX) signal intensity of a transmission-failure station, determines whether a Rx signal strength of the station is higher than the Rx signal intensity of the transmission-failure station, determines whether a MAC Service Data Unit (MSDU) equal to the sum of the transmission data of the station and overhear data of the transmission-failure station is larger than a maximum MSDU, performs fragmentation of the MSDU if the Rx signal strength of the station is higher than the Rx signal intensity of the transmission-failure station and the MSDU is larger than the maximum MSDU, and transmits the fragmented MSDU several times.

10. The overhear-based packet transmission control method according to claim 9, wherein the channel-acquisition station transmits only its own MDSU to the access point (AP) if the absence of the overhear table is determined.

11. The overhear-based packet transmission control method according to claim 9, wherein the station manages the overhear table, determines a presence or absence of a data transmission failure of the other stations, and stores a transmission-failure packet of the other stations in the overhear table.

12. The overhear-based packet transmission control method according to claim 9, wherein the station, if the station has the channel access opportunity and has to compensate the other stations for the channel access opportunity of the station, generates a modified RTS including address information of the compensation-object station, and transmits the modified RTS including the address information to the access point (AP).

13. The overhear-based packet transmission control method according to claim 10, wherein the at least one station, upon receiving an acknowledgement (ACK) message indicating successful transmission completion from the access point (AP) acting as a destination, deletes a list of data to be transmitted to the destination from its own overhear table.

14. The overhear-based packet transmission control method according to claim 9, wherein the access point (AP), upon receiving a modified RTS including address information of a compensation-object station from the station, transmits a CTR to the compensation-object station, and assigns a data transmission opportunity to the compensation-object station.

15. The overhear-based packet transmission control method according to claim 14, wherein the compensation-object station, upon receiving the channel access opportunity acquired by the compensation of the at least one station, does not re-compensate for the acquired channel access opportunity although a debt exists to the other stations, and uses the acquired channel access opportunity for the compensation-object station.

* * * * *